Figure 1:
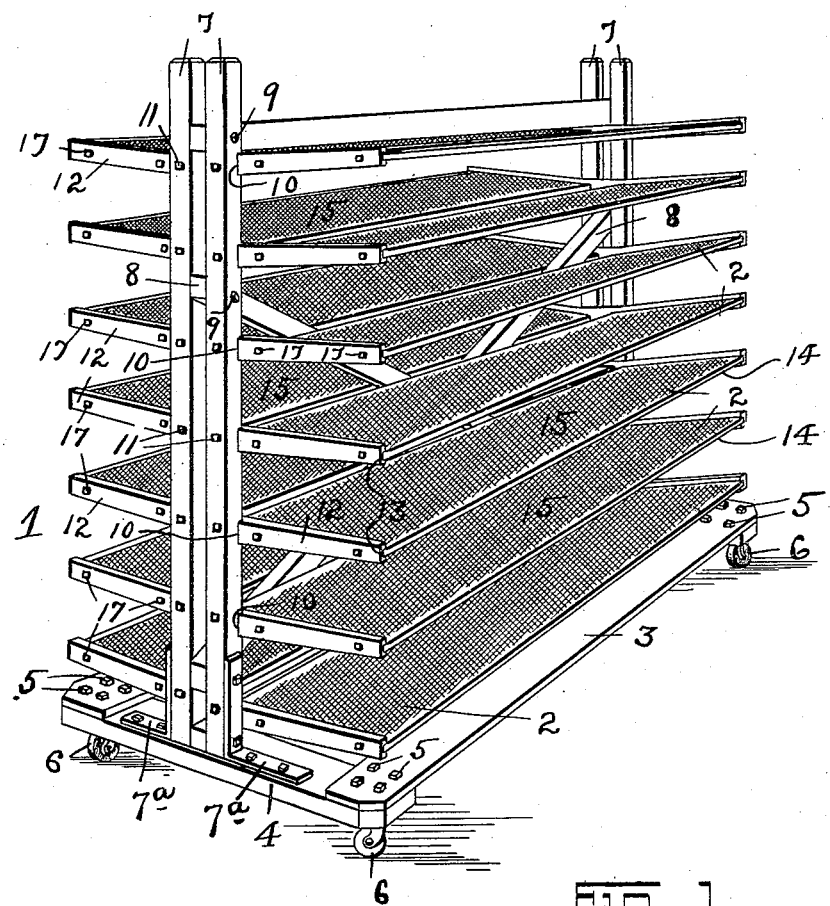

No. 725,851. PATENTED APR. 21, 1903.
J. KOPP.
BREAD OR CAKE RACK.
APPLICATION FILED SEPT. 16, 1902.
NO MODEL. 2 SHEETS—SHEET 1.

WITNESSES: Geo. D. Richards Geo. Douglass

INVENTOR: John Kopp
BY Fred L. C. Fraentzel
ATTORNEY

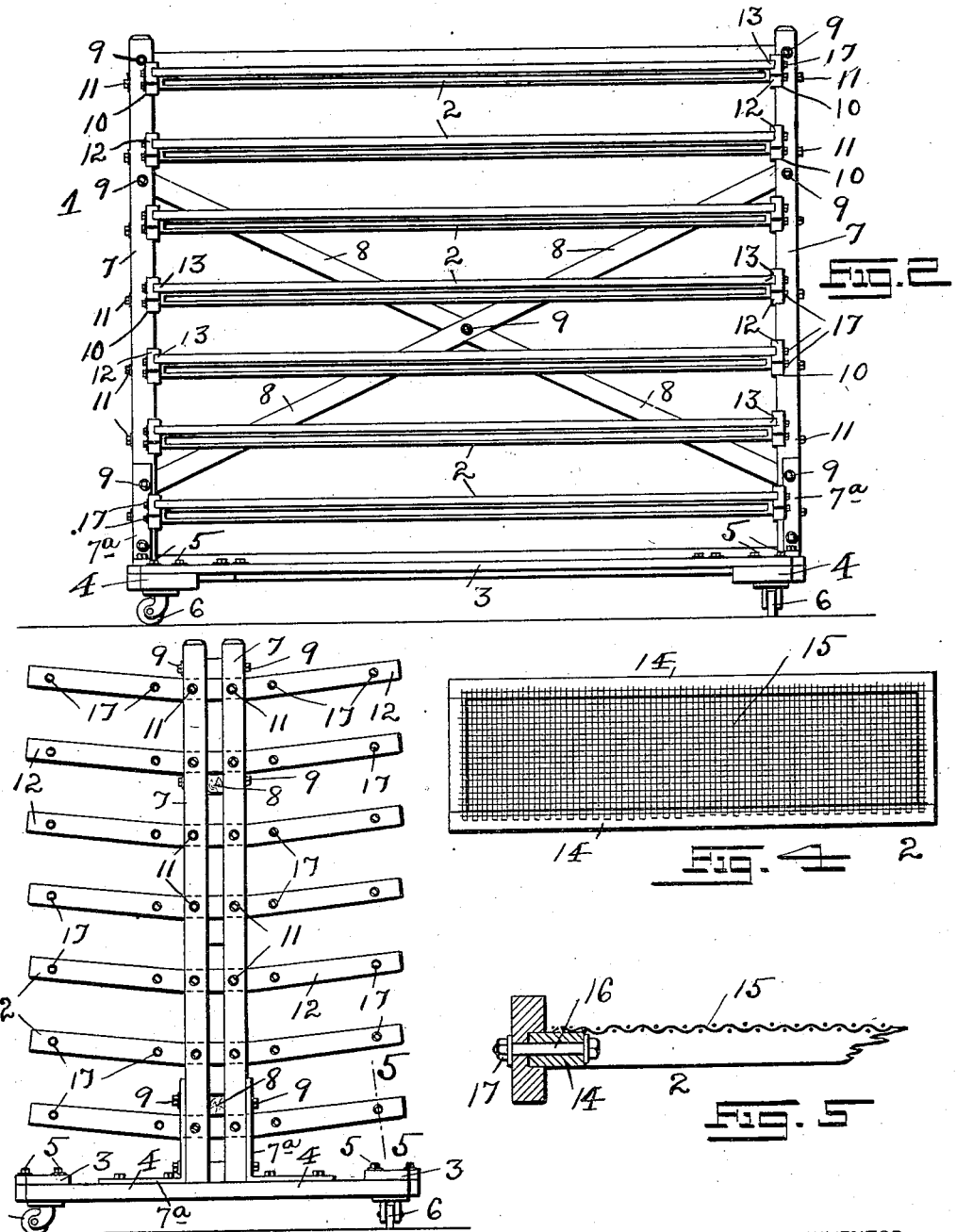

UNITED STATES PATENT OFFICE.

JOHN KOPP, OF NEWARK, NEW JERSEY.

BREAD OR CAKE RACK.

SPECIFICATION forming part of Letters Patent No. 725,851, dated April 21, 1903.

Application filed September 16, 1902. Serial No. 123,564. (No model.)

*To all whom it may concern:*

Be it known that I, JOHN KOPP, a citizen of the United States, residing at Newark, in the county of Essex and State of New Jersey, have invented certain new and useful Improvements in Bread or Cake Racks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference to a novel construction of bread or cake rack for bakers' uses; and the invention has for its principal objects to provide a simple and cheaply constructed rack, which can be moved about from place to place.

A further object of this invention is to provide a durable rack, the frame or shelves thereof being made of metal grating or wire-netting, so as not to absorb the grease from the hot loaves of bread as they come from the oven, and thereby providing a rack which can be easily washed and assures a clean and sanitary rack.

The invention therefore consists in the novel construction of bread or cake rack hereinafter set forth; and, furthermore, this invention consists in the various novel arrangements and combinations of parts, all of which will be hereinafter more particularly described and then finally embodied in the clauses of the claim.

The invention is illustrated in the accompanying drawings, in which—

Figure 1 is a perspective view of a bread or cake rack embodying the principles of my invention; and Figs. 2 and 3 are a front and end view, respectively, of the same. Fig. 4 is a plan view of one of the wire-netting shelves in its detached position; and Fig. 5 is a detail sectional view of a portion of a shelf, said section being taken on line 5 5 in Fig. 3, and said view illustrating one means of securing the shelves in position.

Similar characters of reference are employed in all of the said above-described views to indicate corresponding parts.

In the said drawings, the reference character 1 indicates the complete bread or cake rack, and 2 the various shelves on which the bread or cake is to be placed.

The framework of the rack consists, essentially, of a base usually made of the side piece 3 and end pieces 4, secured together by means of bolts 5 or other suitable fastenings. This base is preferably provided with rollers or casters 6 to enable the moving about of the complete rack when desired. Upon each end piece 4 is a standard 7, preferably a pair of vertical posts upon each end piece 4, as shown, which are stayed or braced by means of a pair of cross bars or braces 8, the several parts being rigidly connected by means of bolts 9 and the angle-irons $7^a$, as shown. Suitably arranged in cut-away parts 10 in the said standards 7 (see Fig. 1) and secured against displacement by means of bolts 11 are certain supports 12, each support being made with a groove or channel 13. Slidably arranged in these grooves or channels 13 are the shelves 2, hereinabove mentioned.

Each shelf 2 consists of a frame 14, and upon each frame is suitably secured and stretched a piece of wire-netting 15, as shown in the drawings. As will be noticed from an inspection of Fig. 5 of the drawings, each frame 2 may be held in its supported position in the grooves or channels 13 of the supports 12 by means of bolts 16, which are passed through the sides of the frame 14 and the supports 12 and are provided on their ends with nuts 17 to guard against accidental displacement. Of course it will be evident that by the removal of these bolts 16 and the nuts 17 the said frames 2 can be readily withdrawn from the supports 12 to permit of the shelves to be washed and also in case of any damage to a shelf to permit its removal and the replacement of the damaged shelf by a new one. The said bolts 16 and the nuts 17 may also be entirely dispensed with and the shelves 2 retained in position between their supports 12 by the inward slope of each support, as shown. This arrangement of inward slope of the supports 12 also causes each pair of shelves to slope in an inward direction toward each other, which has the advantage that in rolling the bread or cake rack from one place to another there is no danger of the loaves being moved from their positions upon the shelves and falling to the floor.

The simplicity of construction of my novel form of bread and cake rack, as well as its sanitary properties, are evident from the above description of my invention.

I am aware that bread-racks are made and are old; but in these racks the shelves for the bread were made from wood, usually slats, and in these constructions the most serious and objectionable feature is that when hot bread is placed upon the shelves the fat and grease from bread percolates into the wooden shelves, and each time fresh bread is placed upon the shelves the heat from the bread melts or softens this grease and causes it to drop upon the loaves on the lower shelves, thereby producing black and dirty loaves of bread. By my invention I have produced a most sanitary rack, upon which the loaves of bread can be placed to be wheeled from in front of the baker's oven to any other place without any danger of in the least soiling the bread or cake and rendering it unfit for table use.

I am aware that changes may be made in the various arrangements and combinations of the parts without departing from the scope of this invention. Hence I do not limit my invention to the exact arrangements and combinations of the parts as described in the previous specification and as illustrated in the accompanying drawings, nor do I confine myself to the exact details of the construction of the same.

Having thus described my invention, what I claim is—

1. As a new article of manufacture, a bread or cake rack comprising a base, having side pieces and connecting end pieces, a pair of standards 7 at the central portion of each side piece, braces 8 having their respective ends arranged and secured between each pair of oppositely-placed standards, supports connected with said standards, and shelves of wire-netting on said supports, substantially as and for the purposes set forth.

2. As a new article of manufacture, a bread or cake rack comprising a base, having side pieces and connecting end pieces, a pair of standards 7 at the central portion of each side piece, braces 8 having their respective ends arranged and secured between each pair of oppositely-placed standards, inwardly-sloping supports connected with said standards, and shelves of wire-netting on said supports, substantially as and for the purposes set forth.

3. As a new article of manufacture, a bread or cake rack, consisting, essentially, of a base having side pieces and connecting end pieces, a pair of standards 7 at the central portion of each side piece, angle-irons connected with the lower end portion of each standard and secured to said base, braces 8 having their respective ends arranged and secured between each pair of oppositely-placed standards, supports connected with said standards, and a shelf of wire-netting on each support, substantially as and for the purposes set forth.

4. As a new article of manufacture, a bread or cake rack, consisting, essentially, of a base having side pieces and connecting end pieces, a pair of standards 7 at the central portion of each side piece, angle-irons connected with the lower end portion of each standard and secured to said base, braces 8 having their respective ends arranged and secured between each pair of oppositely-placed standards, inwardly-sloping supports connected with said standards, and a shelf of wire-netting on each support, substantially as and for the purposes set forth.

5. A bread or cake rack, comprising, a base, standards on said base, supports connected with said standards, each support being provided with a channel, a shelf supported in the channels of each pair of oppositely-placed supports, and means for securing each shelf in position against displacement from said channels consisting, essentially, of bolts 16 and nuts 17, substantially as and for the purposes set forth.

6. A bread or cake rack, comprising, a base, standards on said base, inwardly-sloping supports connected with said standards, each support being provided with a channel, a shelf supported in the channels of each pair of oppositely-placed supports, and means for securing each shelf in position against displacement from said channels, consisting, essentially, of bolts 16 and nuts 17, substantially as and for the purposes set forth.

In testimony that I claim the invention set forth above I have hereunto set my hand this 8th day of September, 1902.

JOHN KOPP.

Witnesses:
 GEO. D. RICHARDS,
 WILL C. HEADLEY.